US012039910B2

(12) United States Patent
Park et al.

(10) Patent No.: US 12,039,910 B2
(45) Date of Patent: Jul. 16, 2024

(54) DISPLAY DEVICE

(71) Applicant: Samsung Display Co., Ltd., Yongin-Si (KR)

(72) Inventors: Seunghyun Park, Seoul (KR); Kyungwon Park, Seoul (KR); Junho Park, Suwon-si (KR); Ilhun Seo, Asan-si (KR); Sang-Uk Lim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/979,802

(22) Filed: Nov. 3, 2022

(65) Prior Publication Data

US 2023/0267869 A1 Aug. 24, 2023

(30) Foreign Application Priority Data

Feb. 22, 2022 (KR) ........................ 10-2022-0023002

(51) Int. Cl.
*G09G 3/20* (2006.01)
*G09G 3/3233* (2016.01)
(Continued)

(52) U.S. Cl.
CPC ......... *G09G 3/2074* (2013.01); *G09G 3/2003* (2013.01); *G09G 3/2096* (2013.01); *G09G 3/3233* (2013.01); *G09G 3/3291* (2013.01); *G09G 3/3607* (2013.01); *G09G 2300/0819* (2013.01); *G09G 2300/0842* (2013.01); *G09G 2310/027* (2013.01); *G09G 2310/08* (2013.01);
(Continued)

(58) Field of Classification Search
CPC ......... G09G 2320/0233; G09G 3/2003; G09G 2320/0242; G09G 2360/16; G09G 3/2074; G09G 2320/0673; G09G 2320/0666; G09G 3/3607; G09G 2320/0626; G09G 2320/0285; G09G 2320/0271; G09G 2320/0276; G09G 5/06; G09G 3/2096; G09G 2320/02
See application file for complete search history.

(56) References Cited

U.S. PATENT DOCUMENTS 10,121,425 B2 * 11/2018 Ahn ..................... G09G 3/3406
2013/0009888 A1 * 1/2013 Park ...................... G06F 3/0421
345/173
(Continued)

FOREIGN PATENT DOCUMENTS

KR 20170080935 A 7/2017
KR 10-2051640 B1 12/2019

*Primary Examiner* — Dismery Mercedes
(74) *Attorney, Agent, or Firm* — Innovation Counsel LLP

(57) ABSTRACT

A display device includes a display panel including a pixel including a first sub-pixel displaying a first color, a second sub-pixel displaying a second color, and a third sub-pixel displaying a third color, a data driver applying a data voltage generated based on input image data to the pixel in an active period, sensing the first sub-pixel to generate first sensing data in a blank period, sensing the second sub-pixel to generate second sensing data in the blank period, and sensing the third sub-pixel to generate third sensing data in the blank period, and a driving controller compensating for the first sensing data, the second sensing data, and the third sensing data based on a grayscale value of the input image data.

19 Claims, 13 Drawing Sheets

(51) Int. Cl.
*G09G 3/3291* (2016.01)
*G09G 3/36* (2006.01)

(52) U.S. Cl.
CPC ............... *G09G 2320/0242* (2013.01); *G09G 2320/0271* (2013.01); *G09G 2320/0276* (2013.01); *G09G 2320/029* (2013.01); *G09G 2360/16* (2013.01)

(56) References Cited

U.S. PATENT DOCUMENTS

| | | | | |
|---|---|---|---|---|
| 2013/0033531 | A1* | 2/2013 | Kim | G09G 3/2007 345/694 |
| 2015/0154913 | A1* | 6/2015 | Kim | G09G 3/3258 345/691 |
| 2015/0379939 | A1* | 12/2015 | Takasugi | G09G 5/18 345/82 |
| 2017/0069278 | A1* | 3/2017 | Kim | G09G 3/3614 |
| 2018/0182321 | A1* | 6/2018 | Zeng | G09G 3/3607 |
| 2020/0135112 | A1* | 4/2020 | Zhang | G09G 3/3233 |
| 2020/0402446 | A1* | 12/2020 | Wang | G09G 3/3208 |
| 2021/0150986 | A1* | 5/2021 | Li | G09G 3/3291 |

* cited by examiner

FIG. 7

GLUT

| RG | CC1 |
|---|---|
| 255 | 2 |
| 254 | 1.8 |
| 253 | 1.7 |
| ⋮ | |

| GG | CC2 |
|---|---|
| 255 | 1.9 |
| 254 | 1.7 |
| 253 | 1.6 |
| ⋮ | |

| BG | CC3 |
|---|---|
| 255 | 1.8 |
| 254 | 1.6 |
| 253 | 1.5 |
| ⋮ | |

FIG. 10

LLUT

| BGR | LC |
|---|---|
| 100% | 0 |
| 90% | 0.2 |
| 80% | 0.3 |
| ⋮ | |

FIG. 12

LLUT

| RBGR | LC1 |
|---|---|
| 100% | 0 |
| 90% | 0.2 |
| 80% | 0.3 |
| ⋮ | |

| GBGR | LC2 |
|---|---|
| 100% | 0 |
| 90% | 0.3 |
| 80% | 0.4 |
| ⋮ | |

| BBGR | LC3 |
|---|---|
| 100% | 0 |
| 90% | 0.4 |
| 80% | 0.5 |
| ⋮ | |

FIG. 14

GLUT

CC1

| | | | |
|---|---|---|---|
| SD1 | 2 | 1.8 | … |
| SD2 | 1.9 | 1.7 | |
| SD3 | 1.8 | 1.6 | |
| RG | 255 | 254 | … |

CC2

| | | | |
|---|---|---|---|
| SD1 | 1.9 | 1.7 | … |
| SD2 | 1.8 | 1.6 | |
| SD3 | 1.7 | 1.5 | |
| GG | 255 | 254 | … |

CC3

| | | | |
|---|---|---|---|
| SD1 | 1.8 | 1.6 | … |
| SD2 | 1.7 | 1.5 | |
| SD3 | 1.6 | 1.4 | |
| BG | 255 | 254 | … |

LLUT

LC1

| | | | |
|---|---|---|---|
| SD1 | 0 | 0.4 | … |
| SD2 | 0 | 0.3 | |
| SD3 | 0 | 0.2 | |
| RBGR | 100% | 90% | … |

LC2

| | | | |
|---|---|---|---|
| SD1 | 0 | 0.5 | … |
| SD2 | 0 | 0.4 | |
| SD3 | 0 | 0.3 | |
| GBGR | 100% | 90% | … |

LC3

| | | | |
|---|---|---|---|
| SD1 | 0 | 0.6 | … |
| SD2 | 0 | 0.5 | |
| SD3 | 0 | 0.4 | |
| BBGR | 100% | 90% | … |

DISPLAY DEVICE

PRIORITY STATEMENT

This application claims priority under 35 U.S.C. § 119 to Korean Patent Application No. 10-2022-0023002, filed on Feb. 22, 2022, in the Korean Intellectual Property Office KIPO, the contents of which are herein incorporated by reference in their entireties.

BACKGROUND

1. Field

Embodiments of the present inventive concept relate to a display device. More particularly, embodiments of the present inventive concept relate to a display device compensating for sensing data.

2. Description of the Related Art

Generally, a display device may include a display panel, a driving controller, gate driver, and a data driver. The display panel may include a plurality of gate lines, a plurality of data lines, and a plurality of pixels electrically connected to the plurality of gate lines and the plurality of data lines. The gate driver may provide gate signals to the plurality of gate lines. The data driver may provide data voltages to the plurality of data lines. The driving controller may control the gate driver and the data driver.

In the display device, differences in characteristics such as a threshold voltage and a mobility of a driving transistor and capacitance of a light emitting element may occur for each of pixels due to process variations. Accordingly, compensation of data voltages applied to the pixels (i.e., compensation of input image data) may be performed to increase display quality.

The display device senses electrical characteristics of a driving transistor and/or a light emitting element to compensate for the input image data. However, there is a problem in that sensing data for electrical characteristics is affected by the data voltage applied to the pixel before sensing.

SUMMARY

Embodiments of the present inventive concept provide a display device reducing an error in sensing data generated by a data voltage applied before generating the sensing data.

According to embodiments of the present inventive concept, a display device may include a display panel including a pixel including a first sub-pixel displaying a first color, a second sub-pixel displaying a second color, and a third sub-pixel displaying a third color, a data driver applying a data voltage generated based on input image data to the pixel in an active period, sensing the first sub-pixel to generate first sensing data in a blank period, sensing the second sub-pixel to generate second sensing data in the blank period, and sensing the third sub-pixel to generate third sensing data in the blank period, and a driving controller compensating for the first sensing data, the second sensing data, and the third sensing data based on a grayscale value of the input image data.

In an embodiment, the driving controller may include a grayscale lookup table in which color compensation values according to the grayscale value of the input image data is stored, and the driving controller may compensate for the first sensing data, the second sensing data, and the third sensing data based on the grayscale lookup table.

In an embodiment, the driving controller may add a first color compensation value according to the grayscale value of the first color of the input image data to the first sensing data, the driving controller may add a second color compensation value according to the grayscale value of the second color of the input image data to the second sensing data, and the driving controller may add a third color compensation value according to the grayscale value of the third color of the input image data to the third sensing data.

In an embodiment, the first color compensation value may increase as the grayscale value of the first color increases, the second color compensation value may increase as the grayscale value of the second color increases, and the third color compensation value may increase as the grayscale value of the third color increases.

In an embodiment, the driving controller may add a first color compensation value according to a type of the sensing data and the grayscale value of the first color of the input image data, a second color compensation value according to a type of the sensing data and the grayscale value of the second color of the input image data, and a third color compensation value according to a type of the sensing data and the grayscale value of the third color of the input image data to each of the first sensing data, the second sensing data, and the third sensing data.

In an embodiment, the driving controller may compensate for the first sensing data, the second sensing data, and the third sensing data based on a black grayscale ratio of the input image data corresponding to a pixel column including the pixel.

In an embodiment, the driving controller may include a load lookup table in which a load compensation value according to the black grayscale ratio of the input image data corresponding to the pixel column is stored, and the driving controller may compensate for the first sensing data, the second sensing data, and the third sensing data based on the load lookup table.

In an embodiment, the driving controller may add a load compensation value according to the black grayscale ratio of the input image data corresponding to the pixel column to each of the first sensing data, the second sensing data, and the third sensing data. In an embodiment, the load compensation value may increase as the black grayscale ratio of the input image data corresponding to the pixel column decreases.

In an embodiment, the driving controller may not add a load compensation value to the first sensing data, the second sensing data, and the third sensing data when the input image data corresponding to the pixel is a black grayscale value, and the driving controller may be add the load compensation value to each of the first sensing data, the second sensing data, and the third sensing data according to the black grayscale ratio of the input image data corresponding to the pixel column when the input image data corresponding to the pixel is not the black grayscale value.

In an embodiment, the driving controller may add a first load compensation value to the first sensing data according to a first black grayscale ratio of the first color of the input image data corresponding to the pixel column, the driving controller may add a second load compensation value to the second sensing data according to a second black grayscale ratio of the second color of the input image data corresponding to the pixel column, and the driving controller may add a third load compensation value to the third sensing data.according to a third black grayscale ratio of the third color of the input image data corresponding to the pixel column In an embodiment, the first load compensation value may increase as the first black grayscale ratio decreases, the second load compensation value may increase as the second black grayscale ratio decreases, and the third load compensation value may increase as the third black gray scale ratio decreases.

In an embodiment, the driving controller may add a first load compensation value according to a type of the sensing data and a first black grayscale ratio of the first color of the input image data corresponding to the pixel column, a second load compensation value according to the type of the sensing data and a second black grayscale ratio of the second color of the input image data corresponding to the pixel column, and a third load compensation value according to the type of the sensing data to which a load compensation value and a third black grayscale ratio of the third color of the input image data corresponding to the pixel column to each of the first sensing data, the second sensing data, and the third sensing data.

According to embodiments of the present inventive concept, the display device may include a display panel including a pixel including a first sub-pixel displaying a first color, a second sub-pixel displaying a second color, and a third sub-pixel displaying a third color, a data driver applying a data voltage generated based on input image data to the pixel in an active period, sensing the first sub-pixel to generate first sensing data in a blank period, sensing the second sub-pixel to generate second sensing data in the blank period, and sensing the third sub-pixel to generate third sensing data in the blank period, and a driving controller compensating for the first sensing data, the second sensing data, and the third sensing data based on a black grayscale ratio of the input image data corresponding to a pixel column including the pixel.

In an embodiment, the driving controller may include a load lookup table in which a load compensation value according to the black grayscale ratio of the input image data corresponding to the pixel column is stored, and the driving controller may compensate for the first sensing data, the second sensing data, and the third sensing data based on the load lookup table.

In an embodiment, the driving controller may add a load compensation value to each of the first sensing data, the second sensing data, and the third sensing data according to the black grayscale ratio of the input image data corresponding to the pixel column.

In an embodiment, the load compensation value may increase as the black grayscale ratio of the input image data corresponding to the pixel column decreases.

In an embodiment, the driving controller may not add a load compensation value to the first sensing data, the second sensing data, and the third sensing data when the input image data corresponding to the pixel is a black grayscale value, and the driving controller may add the load compensation value to each of the first sensing data, the second sensing data, and the third sensing data according to the black grayscale ratio of the input image data corresponding to the pixel column when the input image data corresponding to the pixel is not the black gray scale value.

In an embodiment, the driving controller may add a first load compensation value to the first sensing data according to a first black grayscale ratio of the first color of the input image data corresponding to the pixel column, the driving controller may add a second load compensation value to the second sensing data according to a second black grayscale ratio of the second color of the input image data corresponding to the pixel column, and the driving controller may add a third load compensation value to the third sensing data according to a third black grayscale ratio of the third color of the input image data corresponding to the pixel column.

In an embodiment, the driving controller may add a first load compensation value according to a type of the sensing data and a first black grayscale ratio of the first color of the input image data corresponding to the pixel column, a second load compensation value according to the type of the sensing data and a second black grayscale ratio of the second color of the input image data corresponding to the pixel column, and a third load compensation value according to the type of the sensing data to which a load compensation value and a third black grayscale ratio of the third color of the input image data corresponding to the pixel column to each of the first sensing data, the second sensing data, and the third sensing data.

Therefore, the display device may reduce an influence on sensing data according to a grayscale value of input image data by compensating for first sensing data sensed from a first sub-pixel, second sensing data sensed from a second sub-pixel, and third sensing data sensed from a third sub-pixel based on the grayscale value of the input image data. Accordingly, the display device may reduce an error in the sensing data generated by a data voltage applied before generating the sensing data.

In addition, the display device may reduce an influence on sensing data according to a black grayscale ratio of input image data corresponding to a pixel column including a pixel by compensating for first sensing data sensed from a first sub-pixel, second sensing data sensed from a second sub-pixel, and third sensing data sensed from a third sub-pixel based on the black grayscale ratio of the input image data corresponding to the pixel column. Accordingly, the display device may reduce an error in the sensing data generated by a data voltage applied before generating the sensing data.

However, the effects of the present inventive concept are not limited to the above-described effects, and may be variously expanded without departing from the spirit and scope of the present inventive concept.

BRIEF DESCRIPTION OF THE DRAWINGS

FIG. 7 is a diagram illustrating an example of a grayscale lookup table of the display device of FIG. 1.

FIG. 10 is a diagram illustrating an example of a load lookup table of a display device according to embodiments of the present inventive concept.

FIG. 12 is a diagram illustrating an example of a load lookup table of a display device according to embodiments of the present inventive concept.

FIG. 14 is a diagram illustrating an example of a grayscale lookup table and a load lookup table of a display device according to embodiments of the present inventive concept.

DETAILED DESCRIPTION OF THE INVENTIVE CONCEPT

Hereinafter, the present inventive concept will be explained in detail with reference to the accompanying drawings.

Figure 1:
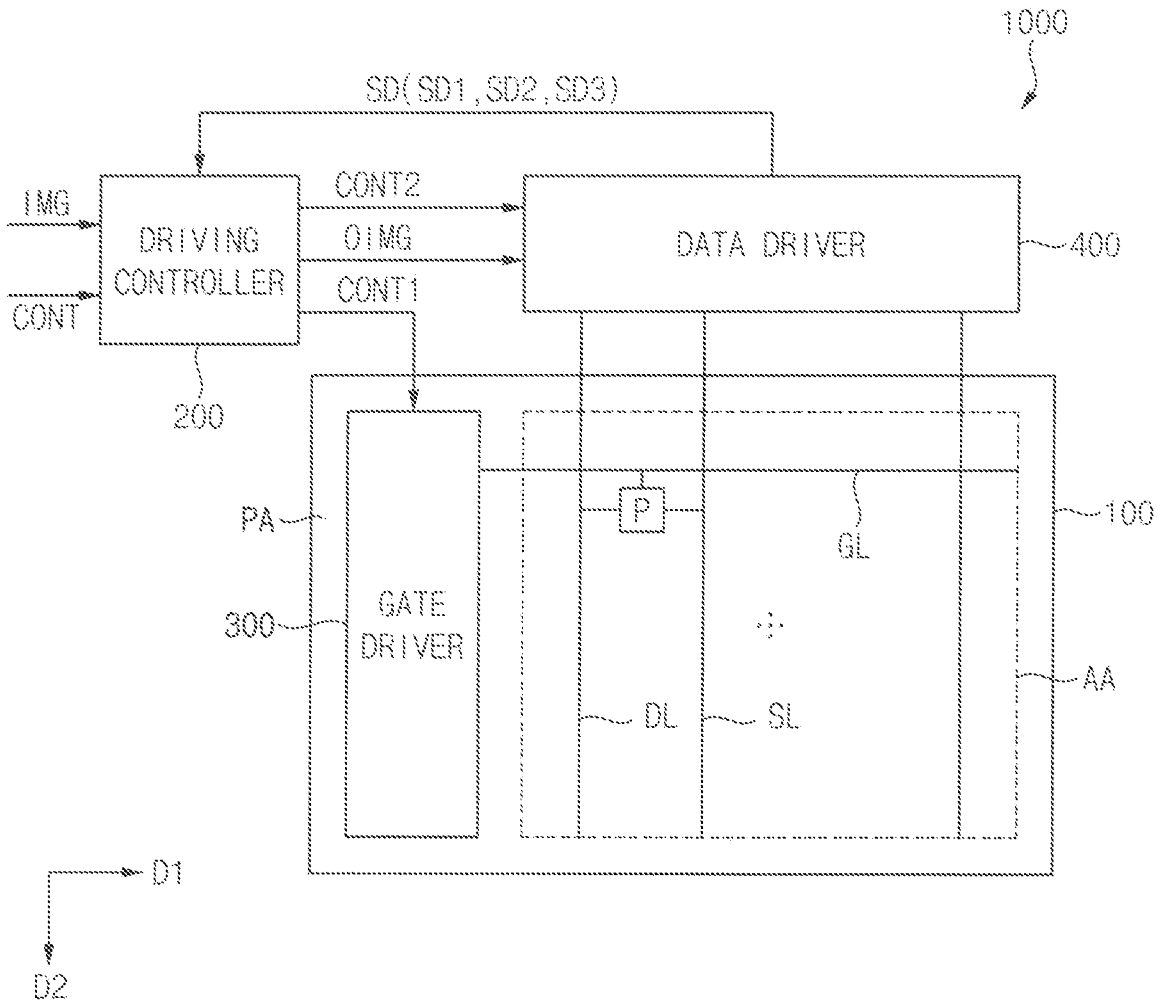
FIG. 1 is a block diagram illustrating a display device according to embodiments of the present inventive concept.

FIG. 1 is a block diagram illustrating a display device 1000 according to embodiments of the present inventive concept.

Referring to FIG. 1, the display device 1000 may include a display panel 100, a driving controller 200, a gate driver 300, and a data driver 400. In an embodiment, the driving controller 200 and the data driver 400 may be integrated into one chip.

The display panel 100 has a display region AA on which an image is displayed and a peripheral region PA disposed adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the plurality of data lines DL and the plurality of gate lines GL. The plurality of gate lines GL may extend in a first direction D1 and the plurality of data lines DL may extend in a second direction D2 crossing the first direction D1.

The driving controller 200 may receive input image data IMG and an input control signal CONT from a host processor (e.g., a graphic processing unit; GPU). The driving controller 200 may receive sensing data (SD1, SD2, SD3; SD) from the data driver 400 which is connected to the plurality of pixels P. For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, and output image data OIMG based on the input image data IMG, the sensing data (SD1, SD2, SD3; SD), and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG, the sensing data (SD1, SD2, SD3; SD), and the input control signal CONT, and generate the output image data OIMG. The driving controller 200 may output the output image data OIMG to the data driver 400.

The gate driver 300 may generate gate signals for driving the plurality of gate lines GL in response to the first control signal CONT1 input from the driving controller 200. The gate driver 300 may output the gate signals to the plurality of gate lines GL. For example, the gate driver 300 may sequentially output the gate signals to the plurality of gate lines GL.

The data driver 400 may receive the second control signal CONT2 and the output image data OIMG from the driving controller 200. The data driver 400 may convert the output image data OIMG into data voltages having an analog type. The data driver 400 may output the data voltage to the plurality of data lines DL. The data driver 400 may sense the plurality of pixels P (e.g., sensing sub-pixels included in the pixels P) to generate the sensing data (SD1, SD2, SD3; SD)

Figure 2:
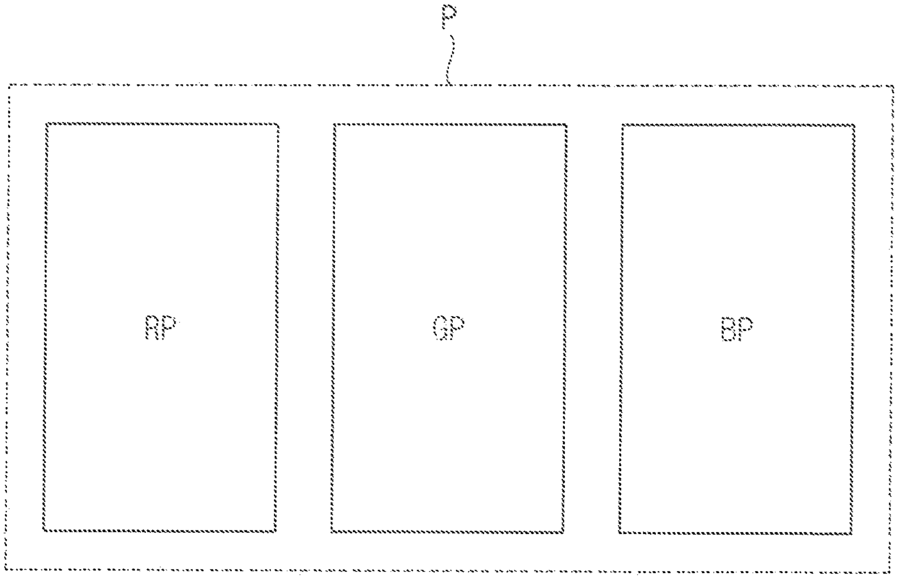
FIG. 2 is a diagram illustrating an example of a pixel of the display device of FIG. 1.
Figure 3:
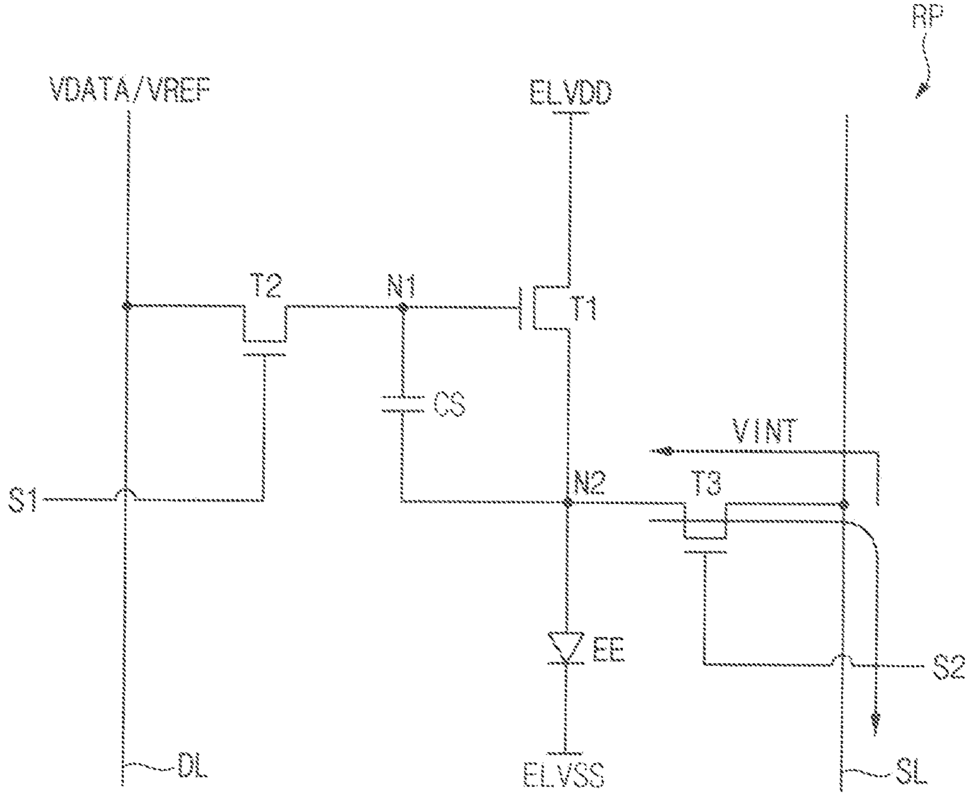
FIG. 3 is a circuit diagram illustrating an example of a first sub-pixel of the display device of FIG. 1.

FIG. 2 is a diagram illustrating an example of the pixel P of the display device 1000 of FIG. 1, and FIG. 3 is a circuit diagram illustrating an example of a first sub-pixel RP of the display device 1000 of FIG. 1.

Referring to FIGS. 1 to 3, the pixel P may include the first sub-pixel RP displaying a first color, a second sub-pixel GP displaying a second color, and a third sub-pixel BP displaying a third color.

Referring to FIG. 3, the first sub-pixel RP may include a first transistor T1 (i.e., a driving transistor) outputting a first power voltage ELVDD to a second node N2 in response to a signal of a first node N1, a second transistor T2 outputting the data voltage VDATA or a reference voltage VREF to the first node N1 in response to a first signal S1, a third transistor T3 outputting a signal of the second node N2 (e.g., a signal for a voltage of the second node N2) to a sensing node in response to a second signal S2 and applying an initialization voltage VINT to the second node N2, a storage capacitor CS including a first terminal connected to the first node N1 and a second terminal N2 connected to the second node N2, and a light emitting element EE including a first electrode connected to the second node N2 and a second electrode receiving a second power voltage ELVSS. Here, the second power voltage ELVSS may be lower than the first power voltage ELVDD. For example, the light emitting element EE may be an organic light emitting diode.

The second sub-pixel GP and the third sub-pixel BP have the same structure as the first sub-pixel RP except for a color emitted. Thus, any repetitive explanation will be omitted.

Figure 4:
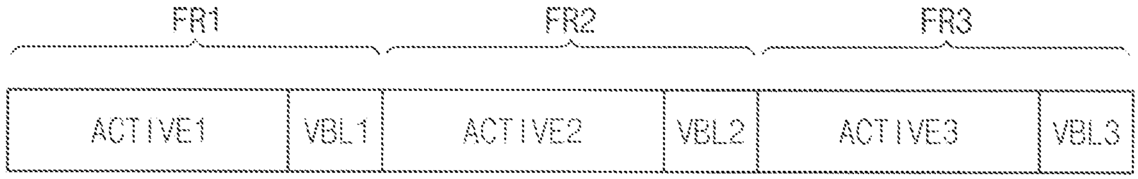
FIG. 4 is a conceptual diagram illustrating a driving timing of the display device of FIG. 1.

FIG. 4 is a conceptual diagram illustrating a driving timing of the display device 1000 of FIG. 1.

Referring to FIGS. 1 to 4, the data driver 400 may apply the data voltage VDATA generated based on the input image data IMG to the pixel P in an active period ACTIVE1, ACTIVE2, and ACTIVE3. The data driver 400 may sense the first sub-pixel RP to generate first sensing data SD1 in a blank period VBL1, VLB2, and VBL3, sense the second sub-pixel GP to generate second sensing data SD2 in the blank period VBL1, VBL2, and VBL3, and sense the third sub-pixel BP to generate third sensing data SD3 in the blank period VBL1, VBL2, and VBL3.

The display device 1000 may be driven in a unit of a frame. The frame FR1, FR2 and FR3 may include the active period ACTIVE1, ACTIVE2 and ACTIVE3 and the blank period VBL1, VBL2 and VBL3. The data voltages VDATA may be applied to the sub-pixels RP, GP, and BP of the display panel 100 in the active period ACTIVE1, ACTIVE2 and ACTIVE3. The data voltages VDATA may not be applied to the sub-pixels RP, GP, and BP of the display panel 100 in the blank period VBL1, VBL2 and VBL3.

For example, a sensing operation (e.g., generating the sensing data (SD1, SD2, SD3; SD) may be performed in the blank period VBL1, VBL2 and VBL3. For example, the sensing data (SD1, SD2, SD3; SD) may be generated in a first blank period VBL1, and the data voltage compensated based on the sensing data (SD1, SD2, SD3; SD) generated in the first blank period VBL1 may be written in the sub-pixels RP, GP, and BP in the second active period ACTIVE2. For example, the sensing data (SD1, SD2, SD3; SD) may be generated in a second blank period VBL2, and the data voltage compensated based on the sensing data (SD1, SD2, SD3; SD) generated in the second blank period VBL2 may be written in the sub-pixels RP, GP, and BP in the third active period ACTIVE3.

Figure 5:
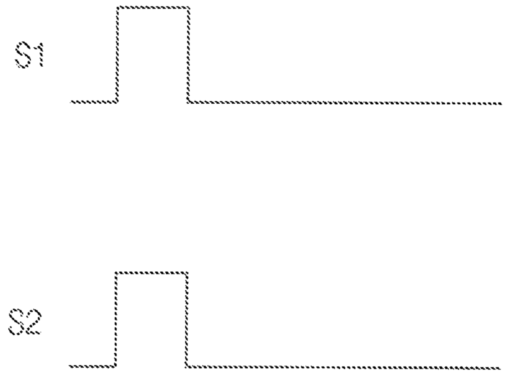
FIG. 5 is a timing diagram illustrating an example in which the display device of FIG. 1 operates in an active period.
Figure 6:
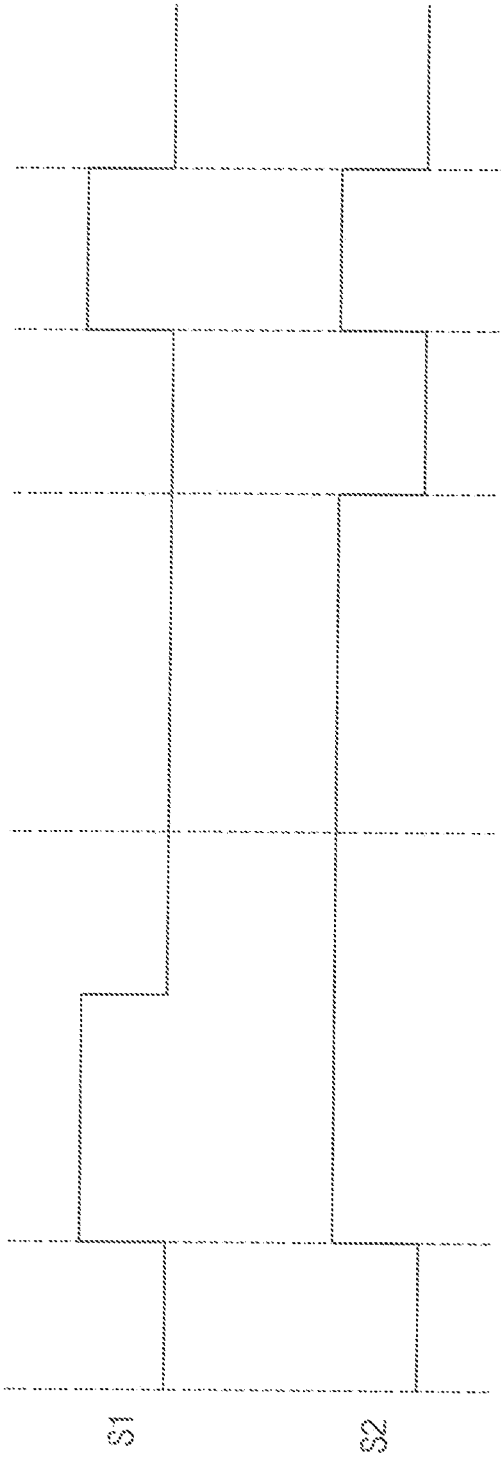
FIG. 6 is a timing diagram illustrating an example in which the display device of FIG. 1 operates in a blank period.

FIG. 5 is a timing diagram illustrating an example in which the display device 1000 of FIG. 1 operates in the active period ACTIVE1, ACTIVE2, and ACTIVE3, and FIG. 6 is a timing diagram illustrating an example in which the display device 1000 of FIG. 1 operates in the blank period VBL1, VBL2, and VBL3.

Referring to FIGS. 1 to 6, the data driver 400 may write the data voltage VDATA for displaying an image in the sub-pixels RP, GP, and BP in the active period ACTIVE1, ACTIVE2, and ACTIVE3, and may generate the sensing data (SD1, SD2, SD3; SD) which include electrical characteristics of the sub-pixels RP, GP, and BP in the blank period VBL1, VBL2, and VBL3.

For example, in the active period ACTIVE1, ACTIVE2, and ACTIVE3, the first signal S1 may have an active level, and the second signal S2 may have the active level. In the active period ACTIVE1, ACTIVE2, and ACTIVE3, the second transistor T2 may be turned on to write the data voltage VDATA to the storage capacitor CS, and the third transistor T3 may be turned on to apply the initialization voltage VINT to the second node N2.

For example, in the blank period VBL1, VBL2, and VBL3, the first signal S1 and the second signal S2 may have the active level and the second transistor T2 and the third transistor T3 may be turned on. The reference voltage VREF is written to the storage capacitor CS via the second transistor T2 which is turned on and the initialization voltage VINT may be applied to the second node N2 via the third transistor T3 which is turned on. Thereafter, the first signal S1 may have an inactive level and the second signal S2 may have the active level. In this case, the data driver 400 may receive (i.e., sense) a signal of the second node N2 through the sensing line SL. Then, the first signal S1 and the second signal S2 may have the active level after having the inactive level. At this time, the second transistor T2 may be turned on to rewrite the data voltage VDATA to the storage capacitor CS and the third transistor T3 may be turned on to apply the initialization voltage VINT to the second node N2.

The reference voltage VREF may be a voltage for sensing an electrical characteristic of the first transistor T1. For example, the electrical characteristic of the first transistor T1 may be the mobility of the first transistor T1. For example, the electrical characteristic of the first transistor T1 may be a threshold voltage of the first transistor T1.

The reference voltage VREF may be a voltage for sensing electrical characteristics of the light emitting element EE. For example, the electrical characteristic of the light emitting element EE may be capacitance at both terminals of the light emitting element EE.

The sensing line SL may be connected to the data driver 400, and the data driver 400 may include an analog-to-digital converter. The analog-to-digital converter may convert the sensing data (SD1, SD2, SD3; SD) from an analog form to a digital form.

The driving controller 200 may compensate for the input image data IMG in order to compensate for a deviation in the electrical characteristics between the pixels P based on the sensed electrical characteristics (i.e., the sensing data (SD1, SD2, SD3; SD).

FIG. 7 is a diagram illustrating an example of a grayscale lookup table GLUT of the display device 1000 of FIG. 1. Color compensation values CC1, CC2, and CC3 of FIG. 7 are arbitrarily designated values, but the color compensation values are not limited thereto.

Referring to FIGS. 1 to 7, the data driver 400 may sense the first sub-pixel RP (i.e., sensing the electrical characteristics of the first sub-pixel RP) to generate the first sensing data SD1, sense the second sub-pixel GP (i.e., sensing the electrical characteristics of the second sub-pixel GP) to generate the second sensing data SD2, and sense the third sub-pixel BP (i.e., sensing the electrical characteristics of the third sub-pixel BP) to generate the third sensing data SD3. The driving controller 200 may compensate for the first sensing data SD1, the second sensing data SD2, and the third sensing data SD3 based on a grayscale value of the input image data IMG. The driving controller 200 may include the grayscale lookup table GLUT in which the color compensation value CC1, CC2, and CC3 according to the grayscale value of the input image data IMG is stored. The driving controller 200 may compensate for the first sensing data SD1, the second sensing data SD2, and the third sensing data SD3 based on the grayscale lookup table GLUT.

In an embodiment, the driving controller 200 may add a first color compensation value CC1 according to the grayscale value RG of the first color of the input image data IMG to the first sensing data SD1, may add a second color compensation value CC2 according to the grayscale value GG of the second color of the input image data IMG to the second sensing data SD2, and may add a third color compensation value CC3 according to the grayscale value BG of the third color of the input image data IMG to the third sensing data SD3. In an embodiment, the first color compensation value CC1 may increase as the grayscale value RG of the first color increases, the second color compensation value CC2 may increase as the grayscale value GG of the second color increases, and the third color compensation value CC3 may increase as the grayscale value BG of the third color increases.

For example, when the data voltage VDATA corresponding to a 255 grayscale value (i.e., the grayscale value RG of the first color) is applied to the first sub-pixel RP in the first active period ACTIVE1, the driving controller 200 may add the first color compensation value CC1 having a value of 2 to the first sensing data SD1 sensed in the first blank period VBL1. When the data voltage VDATA corresponding to a 254 grayscale value (i.e., the grayscale value RG of the first color) is applied to the first sub-pixel RP in the first active period ACTIVE1, the driving controller 200 may add the first color compensation value CC1 having a value of 1.8 to the first sensing data SD1 sensed in the first blank period VBL1. When the data voltage VDATA corresponding to the 255 grayscale value (i.e., the grayscale value GG of the second color) is applied to the second sub-pixel GP in the first active period ACTIVE1, the driving controller 200 may add the second color compensation value CC2 having a value of 1.9 to the second sensing data SD2 sensed in the first blank period VBL1.

Accordingly, the display device 1000 may reduce an error in the voltage of the second node N2 generated by the data voltage VDATA applied to the sub-pixels RP, GP, and BP immediately before sensing, and reduce an error in the sensing data (SD1, SD2, SD3; SD). A process in which the color compensation values CC1, CC2, and CC3 are determined (i.e., generating the grayscale lookup table GLUT) will be described later.

Figure 8:
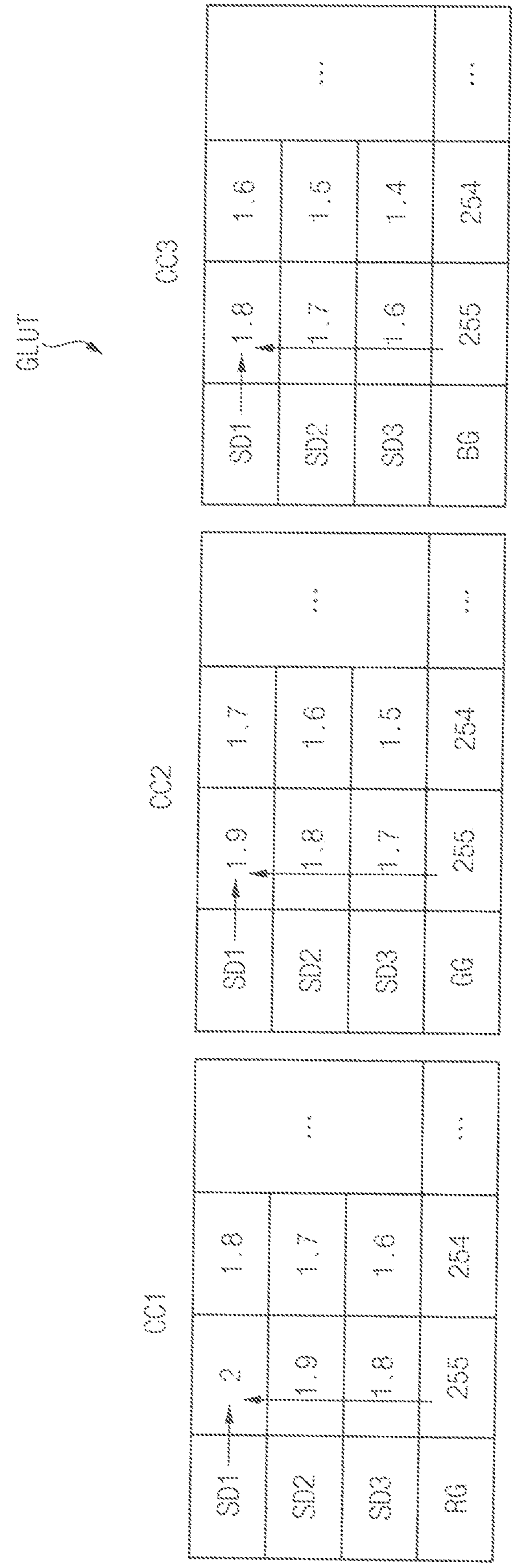
FIG. 8 is a diagram illustrating an example of a grayscale lookup table of a display device according to embodiments of the present inventive concept.

FIG. 8 is a diagram illustrating an example of the grayscale lookup table GLUT of a display device according to embodiments of the present inventive concept. Color compensation values CC1, CC2, and CC3 of FIG. 8 are arbitrarily designated values, but the color compensation values are not limited thereto.

The display device 1000 of FIG. 1 may include the grayscale lookup table GLUT disposed in the driving controller 200. Thus, the same reference numerals are used to refer to the same or similar element, and any repetitive explanation will be omitted.

Referring FIGS. 1 to 6, and 8, the driving controller 200 may add the first color compensation value CC1 according to a type of the sensing data (SD1, SD2, SD3; SD) to which a color compensation value (CC1, CC2, CC3) is added and the grayscale value RG of the first color of the input image data IMG, the second color compensation value CC2 according to the type of the sensing data (SD1, SD2, SD3; SD) to which the compensation value (CC1, CC2, CC3) is added and the grayscale value GG of the second color of the input image data IMG, and the third color compensation value CC3 according to the type of the sensing data (SD1, SD2, SD3; SD) to which the compensation value (CC1, CC2, CC3) is added and the grayscale value BG of the third color of the input image data IMG to each of the first sensing data SD1, the second sensing data SD2, and the third sensing data SD3.

For example, when the data voltage VDATA corresponding to the 255 grayscale value (i.e., the grayscale value RG of the first color) is applied to the first sub-pixel RP in the first active period ACTIVE1, the data voltage VDATA corresponding to the 255 grayscale value (i.e., the grayscale value GG of the second color) is applied to the second sub-pixel GP in the first active period ACTIVE1, and the data voltage VDATA corresponding to the 255 grayscale value (i.e., the grayscale value BG of the third color) is applied to the third sub-pixel BP in the first active period ACTIVE1, the driving controller 200 may add the first color compensation value CC1 having a value of 2, the second color compensation value CC2 having a value of 1.9, and the third color compensation value CC3 having a value of 1.8 to the first sensing data SD1 sensed in the first blank period VBL1.

For example, when the data voltage VDATA corresponding to the 255 grayscale value (i.e., the grayscale value RG of the first color) is applied to the first sub-pixel RP in the first active period ACTIVE1, the data voltage VDATA corresponding to the 255 grayscale value (i.e., the grayscale value GG of the second color) is applied to the second sub-pixel GP in the first active period ACTIVE1, and the data voltage VDATA corresponding to the 255 grayscale value (i.e., the grayscale value BG of the third color) is applied to the third sub-pixel BP in the first active period ACTIVE1, the driving controller 200 may add the first color compensation value CC1 having a value of 1.9, the second color compensation value CC2 having a value of 1.8, and the third color compensation value CC3 having a value of 1.7 to the second sensing data SD2 sensed in the first blank period VBL1.

For example, when the data voltage VDATA corresponding to the 255 grayscale value (i.e., the grayscale value RG of the first color) is applied to the first sub-pixel RP in the first active period ACTIVE1, the data voltage VDATA corresponding to the 255 grayscale value (i.e., the grayscale value GG of the second color) is applied to the second sub-pixel GP in the first active period ACTIVE1, and the data voltage VDATA corresponding to the 255 grayscale value (i.e., the grayscale value BG of the third color) is applied to the third sub-pixel BP in the first active period ACTIVE1, the driving controller 200 may add the first color compensation value CC1 having a value of 1.8, the second color compensation value CC2 having a value of 1.7, and the third color compensation value CC3 having a value of 1.6 to the third sensing data SD3 sensed in the first blank period VBL1.

Figure 9:
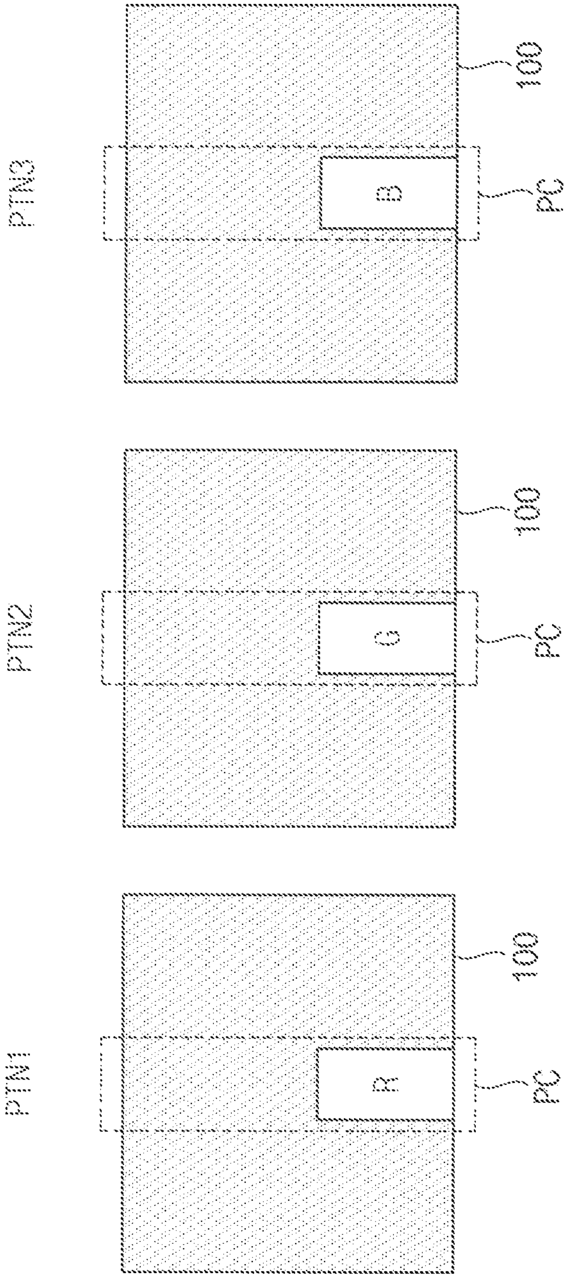
FIG. 9 is a diagram illustrating an example of a pattern for determining color compensation values.

FIG. 9 is a diagram illustrating an example of a pattern for determining the color compensation values CC1, CC2, and CC3.

Referring to FIGS. 1 to 9, the color compensation values CC1, CC2, and CC3 may be determined based on a first pattern PTN1 in which the first color R is displayed on all or part of one pixel column PC (i.e., the first sub-pixel RP may display a grayscale value other than 0, and the second sub-pixel GP and the third sub-pixel BP may display a 0 grayscale value), a second pattern PTN2 in which the second color G is displayed on all or part of one pixel column PC (i.e., the second sub-pixel GP may display a grayscale value other than 0, and the first sub-pixel RP and the third sub-pixel BP may display the 0 grayscale value), and a third pattern PTN3 in which the third color B is displayed on all or part of one pixel column PC (i.e., the third sub-pixel BP may display a grayscale value other than 0, and the first sub-pixel RP and the second sub-pixel GP may display the 0 grayscale value).

For example, the display device may displays a full black pattern (i.e., a pattern in which all grayscale values are the 0 grayscale value) on the display panel 100 in the active period ACTIVE1, ACTIVE2, and ACTIVE3, and may generate the sensing data (SD1, SD2, SD3; SD) in the blank period VBL1, VBL2, and VBL3. The display device may display the first pattern PTN1 on the display panel 100 in the active period ACTIVE1, ACTIVE2, and ACTIVE3, and generate the sensing data (SD1, SD2, SD3; SD) in the blank period VBL1, VBL2, and VBL3. The display device may display the second pattern PTN2 on the display panel 100 in the active period ACTIVE1, ACTIVE2, and ACTIVE3, and generate the sensing data (SD1, SD2, SD3; SD) in the blank period VBL1, VBL2, and VBL3. The display device may display the third pattern PTN3 on the display panel 100 in the active period ACTIVE1, ACTIVE2, and ACTIVE3, and generate the sensing data (SD1, SD2, SD3; SD) in the blank period VBL1, VBL2, and VBL3.

Referring to FIGS. 7 and 9, the first color compensation value CC1 of FIG. 7 may be a difference between the first sensing data SD1 of the full black pattern and the first sensing data SD1 of the first pattern PTN1 in the pixel P where the first color R is displayed. For example, the first color compensation value CC1 for the grayscale value RG of the first color of 255 may be a difference between the first sensing data SD1 of the full black pattern and the first sensing data SD1 of the first pattern PTN1 having the grayscale value RG of the first color of 255 in the pixel P where the first color R is displayed. This is also the same for the second color compensation value CC2 and the third compensation value CC3 of FIG. 7.

Referring to FIGS. 8 and 9, the first color compensation value CC1 of FIG. 8 may be a difference between the sensing data (SD1, SD2, SD3; SD) of the full black pattern and the sensing data (SD1, SD2, SD3; SD) of the first pattern PTN1 in the pixel P where the first color R is displayed. For example, the first color compensation value CC1 for the grayscale value RG of the first color of 255 and the first sensing data SD1 may be a difference between the first sensing data SD1 of the full black pattern and the first sensing data SD1 of the first pattern PTN1 having the grayscale value RG of the first color of 255 in the pixel P where the first color R is displayed. For example, the first color compensation value CC1 for the grayscale value RG of the first color of 255 and the second sensing data SD2 may be a difference between the second sensing data SD2 of the full black pattern and the second sensing data SD2 of the first pattern PTN1 having the grayscale value RG of the first color of 255 in the pixel P where the first color R is displayed. For example, the first color compensation value CC1 for the grayscale value RG of the first color of 255 and the third sensing data SD3 may be a difference between the third sensing data SD3 of the full black pattern and the third sensing data SD3 of the first pattern PTN1 having the grayscale value RG of the first color of 255 in the pixel P where the first color R is displayed. For example, the second color compensation value CC2 for the grayscale value GG of the second color of 255 and the first sensing data SD1 may be a difference between the first sensing data SD1 of the full black pattern and the first sensing data SD1 of the first pattern PTN1 having the grayscale value GG of the second color of 255 in the pixel P where the second color G is displayed. For example, the second color compensation value CC2 for the grayscale value GG of the second color of 255 and the second sensing data SD2 may be a difference between the second sensing data SD2 of the full black pattern and the second sensing data SD2 of the first pattern PTN1 having the grayscale value GG of the second color of 255 in the pixel P where the first color R is displayed. For example, the second color compensation value CC2 for the grayscale value GG of the second color of 255 and the third sensing data SD3 may be a difference between the third sensing data SD3 of the full black pattern and the third sensing data SD3 of the first pattern PTN1 having the grayscale value GG of the second color of 255 in the pixel P where the second color G is displayed. For example, the third color compensation value CC3 for the grayscale value BG of the third color of 255 and the first sensing data SD1 may be a difference between the first sensing data SD1 of the full black pattern and the first sensing data SD1 of the first pattern PTN1 having the grayscale value BG of the third color of 255 in the pixel P where the third color B is displayed. For example, the third color compensation value CC3 for the grayscale value BG of the third color of 255 and the second sensing data SD2 may be a difference between the second sensing data SD2 of the full black pattern and the second sensing data SD2 of the first pattern PTN1 having the grayscale value BG of the third color of 255 in the pixel P where the third color B is displayed. For example, the third color compensation value CC3 for the grayscale value BG of the third color of 255 and the third sensing data SD3 may be a difference between the third sensing data SD3 of the full black pattern and the third sensing data SD3 of the first pattern PTN1 having the grayscale value BG of the third color of 255 in the pixel P where the third color B is displayed.

Figure 11:
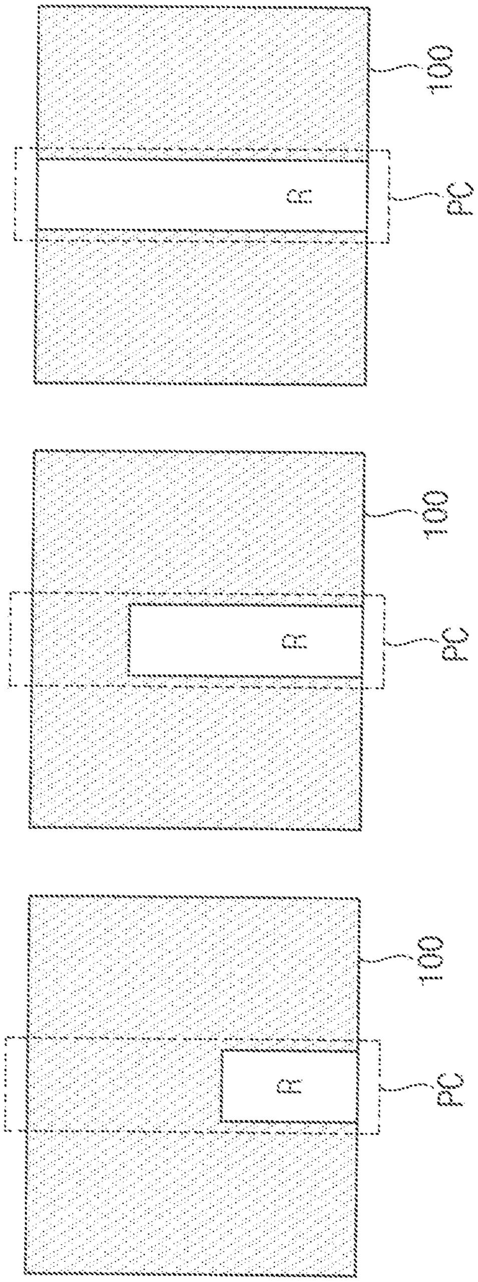
FIG. 11 is a diagram illustrating an example of a pattern for determining a load compensation value.

FIG. 10 is a diagram illustrating an example of a load lookup table LLUT of a display device according to embodiments of the present inventive concept, and FIG. 11 is a diagram illustrating an example of a pattern for determining a load compensation value LC. The load compensation value LC of FIG. 10 are arbitrarily designated values, but the load compensation value LC are not limited thereto.

The display device 1000 of FIG. 1 may include the load lookup table LLUT. Thus, the same reference numerals are used to refer to the same or similar element, and any repetitive explanation will be omitted.

Referring to FIGS. 1 to 6, 10, and 11, the driving controller 200 may compensate for the first sensing data SD1, the second sensing data SD2, and the third sensing data SD3 based on a black grayscale ratio BGR of the input image data IMG corresponding to a pixel column PC including the pixel P. The driving controller 200 may include the load lookup table LLUT in which the load compensation value LC according to the black grayscale ratio BGR of the input image data IMG corresponding to the pixel column PC is stored and may compensate for the first sensing data SD1, the second sensing data SD2, and the third sensing data SD3 based on the load lookup table LLUT. Here, the black grayscale ratio BGR of the input image data IMG corresponding to the pixel column PC may be a ratio of a black image among an image displayed in the pixel column PC. That is, the black grayscale ratio BGR of the input image data IMG corresponding to the pixel column PC may be a ratio of the pixels P of 0 grayscale value (i.e., the grayscale value of the first color, the grayscale value of the second color, and the grayscale value of the third color are all 0 grayscale value) among the pixels P included in the pixel column PC. For example, when 50% of the pixels P included in the pixel column PC display the 0 grayscale value, the black grayscale ratio BGR of the input image data IMG corresponding to the pixel column PC may be 50%.

In an embodiment, the driving controller 200 may add the load compensation value LC according to the black grayscale ratio BGR of the input image data IMG corresponding to the pixel column PC to each of the first sensing data SD1, the second sensing data SD2, and the third sensing data SD3. In an embodiment, the load compensation value LC may increase as the black grayscale ratio BGR of the input image data IMG corresponding to the pixel column PC decreases.

For example, when the black grayscale ratio BGR of the input image data IMG corresponding to the pixel column PC including a specific pixel is 90% in the first active period ACTIVE1, the driving controller 200 may add the load compensation value LC having a value of 0.2 generated by sensing the sub-pixels RP, GP, and BP included in the specific pixel in the first blank period VBL1 to the first sensing data SD1, the second sensing data SD2, and the third sensing data SD3.

The load compensation value LC may be determined by a load pattern in which the first color R, the second color (G of FIG. 9), or the third color (B of FIG. 9) is displayed on all or part of one pixel column PC. (FIG. 11 is an example of a pattern in which the first color R is displayed).

For example, in the blank period VBL1, VBL2, and VBL3, the display device may generate the sensing data (SD1, SD2, SD3; SD) by varying the black grayscale ratio BGR of the input image data IMG corresponding to one pixel column PC in the display panel 100 (i.e., by varying the black grayscale ratio BGR of the input image data IMG corresponding to the pixel column PC in which the first color R, the second color, or the third color of the load pattern is displayed). The load compensation value LC may be a value for compensating for a change amount of the sensing data (SD1, SD2, SD3; SD) according to the black grayscale ratio BGR of the input image data IMG corresponding to the pixel column PC.

In an embodiment, the driving controller 200 may not add the load compensation value LC according to the black grayscale ratio BGR of the input image data IMG corresponding to the pixel column PC to each of the first sensing data SD1, the second sensing data SD2, and the third sensing data SD3 when the input image data IMG corresponding to the pixel P is a black grayscale value. The driving controller 200 may add the load compensation value LC according to the black grayscale ratio BGR of the input image data IMG corresponding to the pixel column PC to each of the first sensing data SD1, the second sensing data SD2, and the third sensing data SD3 when the input image data IMG corresponding to the pixel P is not the black grayscale value. In an embodiment, when a part of an image displayed in a specific pixel column PC display a black image, the driving controller 200 may not add the load compensation value LC to the sensing data (SD1, SD2, SD3; SD) sensed from the pixels P displaying the black image.

FIG. 12 is a diagram illustrating an example of the load lookup table LLUT of a display device according to embodiments of the present inventive concept.

The display device according to the present embodiment is substantially the same as the display device of FIG. 10 except for the load lookup table LLUT. Thus, the same reference numerals are used to refer to the same or similar element, and any repetitive explanation will be omitted.

Referring to FIGS. 1 to 6, 11, and 12, the driving controller 200 may add a first load compensation value LC1 according to a first black grayscale ratio RBGR of the first color of the input image data IMG corresponding to the pixel column PC to the first sensing data SD1, add a second load compensation value LC2 according to a second black grayscale ratio GB GR of the second color of the input image data IMG corresponding to the pixel column PC to the second sensing data SD2, and add a third load compensation value LC3 according to a third black grayscale ratio BBGR of the third color of the input image data IMG corresponding to the pixel column PC to the third sensing data SD3. In an embodiment, the first load compensation value LC1 may increase as the first black grayscale ratio RBGR decreases, the second load compensation value LC2 may increase as the second black grayscale ratio GBGR decreases, and the third load compensation value LC3 may increase as the third black grayscale ratio BBGR decreases. Here, the first black grayscale ratio RBGR may be a ratio of the black image among an image displayed on the first sub-pixels RP of the pixel column PC. That is, the first black grayscale ratio RBGR may be a ratio of the first sub-pixels RP to which the data voltage corresponding to the 0 grayscale value is applied among the first sub-pixels RP included in the pixel column PC. For example, when 50% of the first sub-pixels RP included in the pixel column PC display the 0 grayscale value, the first black grayscale ratio RBGR may be 50%. The second black grayscale ratio GBGR and the third black grayscale ratio BBGR may be decided the same way as the first black grayscale ratio RBGR is decided.

For example, when the first black grayscale ratio RBGR of the input image data IMG corresponding to the pixel column PC including a specific pixel in the first active period ACTIVE1 is 90%, the driving controller 200 may add the first load compensation value LC1 having a value of 0.2 to the first sensing data SD1 sensed from the first sub-pixel RP included in the specific pixel. This is also the same for the second sensing data SD2 and the third sensing data SD3.

The first load compensation value LC1 may be determined based on the load pattern in which the first color is displayed on all or a part of one pixel column PC (FIG. 11 is an example of a pattern in which the first color is displayed), the second load compensation value LC2 may be determined based on the load pattern in which the second color is displayed on all or a part of one pixel column PC (FIG. 11 is an example of a pattern in which the first color is displayed), and the third load compensation value LC3 may be determined based on the load pattern in which the third color is displayed on all or a part of one pixel column PC (FIG. 11 is an example of a pattern in which the first color is displayed).

For example, in the blank period VBL1, VBL2, and VBL3, the display device may generate the sensing data (SD1, SD2, SD3; SD) by varying the first black grayscale ratio RBGR, the second black grayscale ratio GBGR, and the third black grayscale ratio BBGR of the input image data IMG corresponding to one pixel column PC in the display panel 100. The first load compensation value LC1, the second load compensation value LC2, and the third load compensation value LC3 may be values for compensating for a change amount of the sensing data (SD1, SD2, SD; SD) according to the first black grayscale ratio RBGR, the second black grayscale ratio GBGR, and the third black grayscale ratio BBGR of the input image data IMG corresponding to the pixel column PC.

Figure 13:
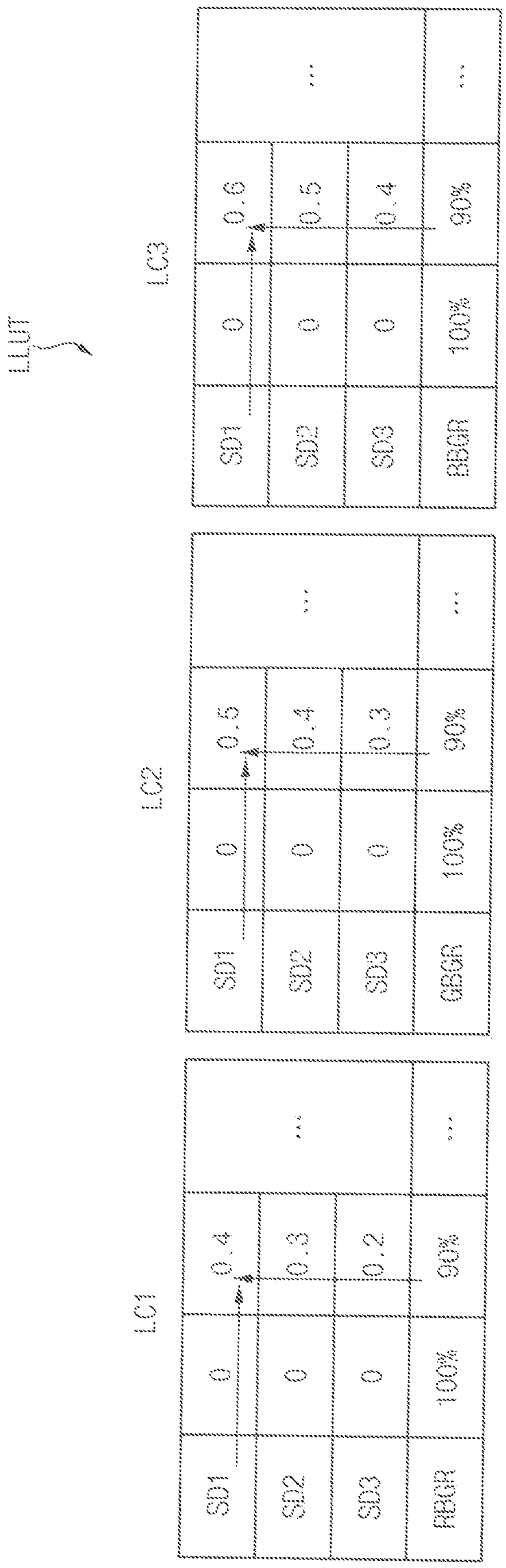
FIG. 13 is a diagram illustrating an example of a load lookup table of a display device according to embodiments of the present inventive concept.

FIG. 13 is a diagram illustrating an example of the load lookup table LLUT of a display device according to embodiments of the present inventive concept. The load compensation value LC1, LC2, and LC3 of FIG. 13 are arbitrarily designated values, but the load compensation value are not limited thereto.

The display device according to the present embodiment is substantially the same as the display device of FIG. 12 except for the load lookup table LLUT. Thus, the same reference numerals are used to refer to the same or similar element, and any repetitive explanation will be omitted.

Referring to FIGS. 1 to 6, 11, and 13, the driving controller 200 may add the first load compensation value LC1 according to a type of the sensing data (SD1, SD2, SD3; SD) to which a load compensation value (LC1, LC2, LC3) is added and the first black grayscale ratio RBGR of the first color of the input image data IMG corresponding to the pixel column PC, the second load compensation value LC2 according to the type of the sensing data (SD1, SD2, SD3; SD) to which the load compensation value (LC1, LC2, LC3) is added and the second black grayscale ratio GB GR of the second color of the input image data IMG corresponding to the pixel column PC, and the third load compensation value LC3 according to the type of the sensing data (SD1, SD2, SD3; SD) to which the load compensation value (LC1, LC2, LC3) is added and the third black grayscale ratio BB GR of the third color of the input image data IMG corresponding to the pixel column PC to each of the first sensing data SD1, the second sensing data SD2, and the third sensing data SD3.

For example, when the first black grayscale ratio RBGR of the input image data IMG corresponding to the pixel column PC including a specific pixel is 90% in the first active period ACTIVE1, the second black grayscale ratio GBGR of the input image data IMG corresponding to the pixel column PC including the specific pixel is 90% in the first active period ACTIVE1, and the third black grayscale ratio BBGR of the input image data IMG corresponding to the pixel column PC including the specific pixel is 90% in the first active period ACTIVE1, the driving controller 200 may add the first load compensation value LC1 having a value of 0.4, the second load compensation value LC2 having a value of 0.5, and a third load compensation value LC3 having a value of 0.6 to the first sensing data SD1 sensed from the first sub-pixel RP included in the specific pixel in the first blank period VBL1.

For example, when the first black grayscale ratio RBGR of the input image data IMG corresponding to the pixel column PC including a specific pixel is 90% in the first active period ACTIVE1, the second black grayscale ratio GBGR of the input image data IMG corresponding to the pixel column PC including the specific pixel is 90% in the first active period ACTIVE1, and the third black grayscale ratio BBGR of the input image data IMG corresponding to the pixel column PC including the specific pixel is 90% in the first active period ACTIVE1, the driving controller 200 may add the first load compensation value LC1 having a value of 0.3, the second load compensation value LC2 having a value of 0.4, and a third load compensation value LC3 having a value of 0.5 to the second sensing data SD2 sensed from the second sub-pixel GP included in the specific pixel in the first blank period VBL1. This is also the same for the third sensing data SD3.

The first load compensation value LC1 may be determined based on the load pattern in which the first color is displayed on all or a part of one pixel column PC (FIG. 11 is an example of a pattern in which the first color is displayed), the second load compensation value LC2 may be determined based on the load pattern in which the second color is displayed on all or a part of one pixel column PC (FIG. 11 is an example of a pattern in which the first color is displayed), and the third load compensation value LC3 may be determined based on the load pattern in which the third color is displayed on all or a part of one pixel column PC (FIG. 11 is an example of a pattern in which the first color is displayed).

FIG. 14 is a diagram illustrating an example of the grayscale lookup table GLUT and the load lookup table LLUT of a display device according to embodiments of the present inventive concept. The load compensation value LC1, LC2, and LC3 and the color compensation value CC1, CC2, and CC3 of FIG. 14 are arbitrarily designated values, but the load compensation value and the color compensation value are not limited thereto.

The display device according to the present embodiment is substantially the same as the display device of FIG. 13 except for the grayscale lookup table GLUT. Thus, the same reference numerals are used to refer to the same or similar element, and any repetitive explanation will be omitted.

Referring to FIGS. 1 to 6, and 14, the driving controller 200 may add the first color compensation value CC1 according to a type of the sensing data (SD1, SD2, SD3; SD) to which the color compensation value (CC1, CC2, CC3) is added and the grayscale value RG of the first color of the input image data IMG, the second color compensation value CC2 according to the type of the sensing data (SD1, SD2, SD3; SD) to which the color compensation value (CC1, CC2, CC3) is added and the grayscale value GG of the second color of the input image data IMG, and the third color compensation value CC3 according to the type of the sensing data (SD1, SD2, SD3; SD) to which the color compensation value (CC1, CC2, CC3) is added the grayscale value BG of the third color of the input image data IMG to each of the first sensing data SD1, the second sensing data SD2, and the third sensing data SD3. Since these are described above with reference to FIG. 8 above, duplicated description related thereto will not be repeated.

The driving controller 200 may add the first load compensation value LC1 according to a type of the sensing data (SD1, SD2, SD3; SD) to which the load compensation value (LC1, LC2, LC3) is added and the first black grayscale ratio RBGR of the first color of the input image data IMG corresponding to the pixel column PC, the second load compensation value LC2 according to the type of the sensing data (SD1, SD2, SD3; SD) to which the load compensation value (LC1, LC2, LC3) is added and the second black grayscale ratio GBGR of the second color of the input image data IMG corresponding to the pixel column PC, and the third load compensation value LC3 according to the type of the sensing data (SD1, SD2, SD3; SD) to which the load compensation value (LC1, LC2, LC3) is added and the third black grayscale ratio BB GR of the third color of the input image data IMG corresponding to the pixel column PC to each of the first sensing data SD1, the second sensing data SD2, and the third sensing data SD3. Since these are described above with reference to FIG. 13 above, duplicated description related thereto will not be repeated.

Figure 15:
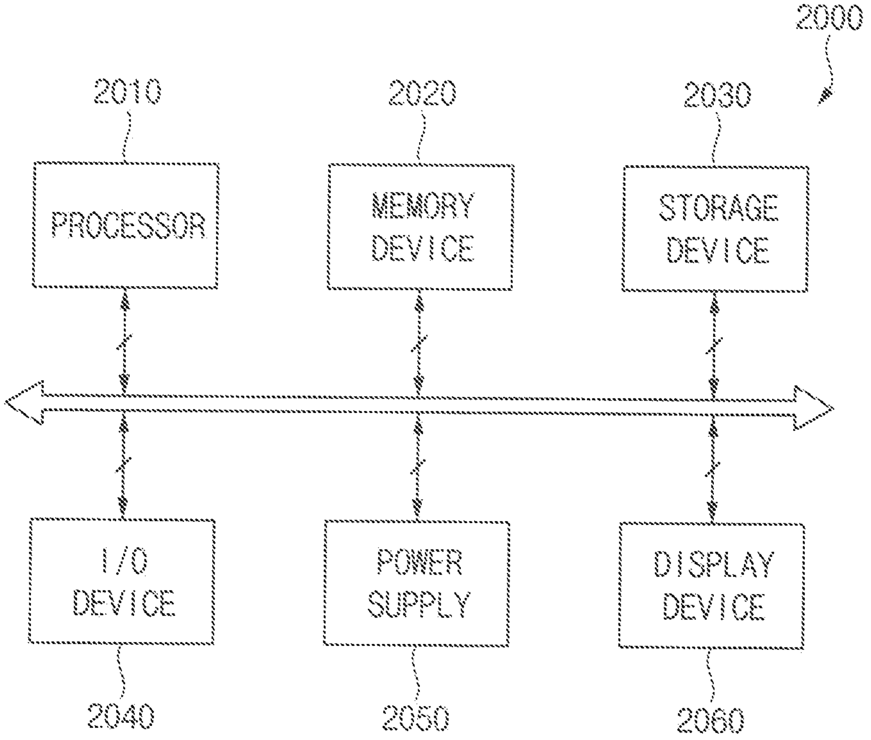
FIG. 15 is a block diagram showing an electronic device according to embodiments.
Figure 16:
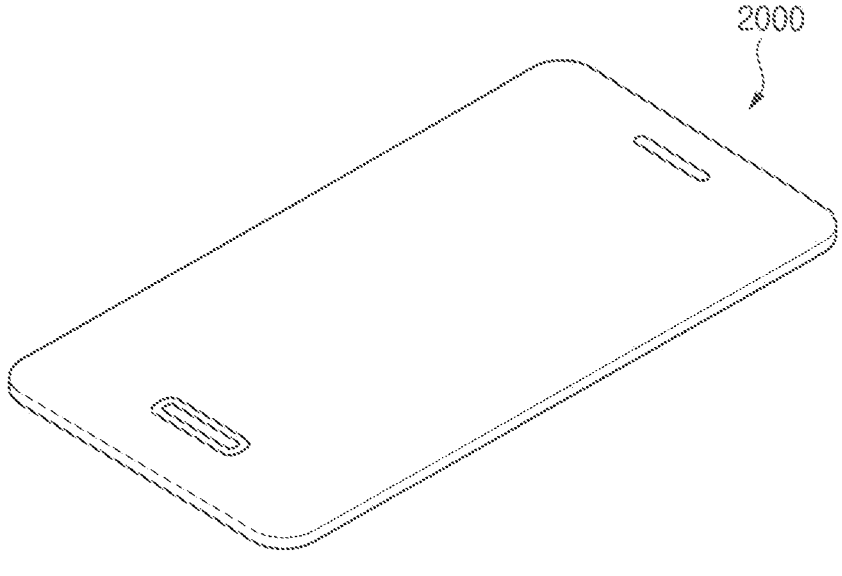
FIG. 16 is a diagram showing an example in which the electronic device of FIG. 15 is implemented as a smart phone.

FIG. 15 is a block diagram showing an electronic device according to embodiments, and FIG. 16 is a diagram showing an example in which the electronic device of FIG. 15 is implemented as a smart phone.

Referring to FIGS. 15 and 16, the electronic device 2000 may include a processor 2010, a memory device 2020, a storage device 2030, an input/output (I/O) device 2040, a power supply 2050, and a display device 2060. Here, the display device 2060 may be the display device 1000 of FIG. 1. In addition, the electronic device 2000 may further include a plurality of ports for communicating with a video card, a sound card, a memory card, a universal serial bus (USB) device, other electronic devices, etc. In an embodiment, as shown in FIG. 16, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, etc.

The processor 2010 may perform various computing functions. The processor 2010 may be a microprocessor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but the display device is not limited thereto. The display device 2060 may be coupled to other components via the buses or other communication links. Here, the display device 2060 may reduce an influence on the sensing data according to the grayscale value of the input image data and an influence on the sensing data according to the black grayscale ratio of the input image data corresponding to the pixel column including the pixel. Accordingly, the display device 2060 may reduce an error in the sensing data generated by a data voltage applied before generating the sensing data.

In an embodiment, the display device 2060 may include the display panel including the pixel including the first sub-pixel displaying the first color, the second sub-pixel displaying the second color, and the third sub-pixel displaying the third color, the data driver configured to apply the data voltage generated based on input image data to the pixel in the active period, to sense the first sub-pixel to generate first sensing data in the blank period, to sense the second sub-pixel to generate second sensing data in the blank period, and to sense the third sub-pixel to generate third sensing data in the blank period, and the driving controller configured to compensate for the first sensing data, the second sensing data, and the third sensing data based on the grayscale value of the input image data.

In another embodiment, the display device 2060 may include the display panel including the pixel including the first sub-pixel displaying the first color, the second sub-pixel displaying the second color, and the third sub-pixel displaying the third color, the data driver configured to apply the data voltage generated based on input image data to the pixel in the active period, to sense the first sub-pixel to generate first sensing data in the blank period, to sense the second sub-pixel to generate second sensing data in the blank period, and to sense the third sub-pixel to generate third sensing data in the blank period, and the driving controller configured to compensate for the first sensing data, the second sensing data, and the third sensing data based on the black grayscale ratio of the input image data corresponding to the pixel column including the pixel. Since these are described above with reference to FIGS. 1 to 14, duplicated description related thereto will not be repeated.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A display device comprising:

a display panel including a pixel including a first sub-pixel displaying a first color, a second sub-pixel displaying a second color, and a third sub-pixel displaying a third color;

a data driver applying data voltages generated based on input image data to the pixel in an active period, sensing the first sub-pixel to generate first sensing data in a blank period, sensing the second sub-pixel to generate second sensing data in the blank period, and sensing the third sub-pixel to generate third sensing data in the blank period; and a driving controller compensating for the first sensing data, the second sensing data, and the third sensing data based on a grayscale value of the input image data, wherein the driving controller compensates for the first sensing data, the second sensing data, and the third sensing data based on a black grayscale ratio of the input image data corresponding to a pixel column including the pixel.

2. The display device of claim 1, wherein the driving controller includes a grayscale lookup table in which color compensation values according to the grayscale value of the input image data is stored, and wherein the driving controller compensates for the first sensing data, the second sensing data, and the third sensing data based on the grayscale lookup table.

3. The display device of claim 1, wherein the driving controller adds a first color compensation value according to the grayscale value of the first color of the input image data to the first sensing data, wherein the driving controller adds a second color compensation value according to the grayscale value of the second color of the input image data to the second sensing data, and wherein the driving controller adds a third color compensation value according to the grayscale value of the third color of the input image data to the third sensing data.

4. The display device of claim 3, wherein the first color compensation value increases as the grayscale value of the first color increases, wherein the second color compensation value increases as the grayscale value of the second color increases, and wherein the third color compensation value increases as the grayscale value of the third color increases.

5. The display device of claim 1, wherein the driving controller adds a first color compensation value according to a type of the sensing data and the grayscale value of the first color of the input image data, a second color compensation value according to a type of the sensing data and the grayscale value of the second color of the input image data, and a third color compensation value according to a type of the sensing data and the grayscale value of the third color of the input image data to each of the first sensing data, the second sensing data, and the third sensing data.

6. The display device of claim 1, wherein the driving controller includes a load lookup table in which a load compensation value according to the black grayscale ratio of the input image data corresponding to the pixel column is stored, and wherein the driving controller compensates for the first sensing data, the second sensing data, and the third sensing data based on the load lookup table.

7. The display device of claim 6, wherein the driving controller adds a load compensation value according to the black grayscale ratio of the input image data corresponding to the pixel column to each of the first sensing data, the second sensing data, and the third sensing data.

8. The display device of claim 7, wherein the load compensation value increases as the black grayscale ratio of the input image data corresponding to the pixel column decreases.

9. The display device of claim 1, wherein the driving controller does not add a load compensation value to the first sensing data, the second sensing data, and the third sensing data when the input image data corresponding to the pixel is a black grayscale value, and wherein the driving controller adds the load compensation value to each of the first sensing data, the second sensing data, and the third sensing data according to the black grayscale ratio of the input image data corresponding to the pixel column when the input image data corresponding to the pixel is not the black grayscale value.

10. The display device of claim 1, wherein the driving controller adds a first load compensation value to the first sensing data according to a first black grayscale ratio of the first color of the input image data corresponding to the pixel column, wherein the driving controller adds a second load compensation value to the second sensing data according to a second black grayscale ratio of the second color of the input image data corresponding to the pixel column, and wherein the driving controller adds a third load compensation value to the third sensing data according to a third black grayscale ratio of the third color of the input image data corresponding to the pixel column.

11. The display device of claim 10, wherein the first load compensation value increases as the first black grayscale ratio decreases, wherein the second load compensation value increases as the second black grayscale ratio decreases, and wherein the third load compensation value increases as the third black grayscale ratio decreases.

12. The display device of claim 1, wherein the driving controller adds a first load compensation value according to a type of the sensing data and a first black grayscale ratio of the first color of the input image data corresponding to the pixel column, a second load compensation value according to the type of the sensing data and a second black grayscale ratio of the second color of the input image data corresponding to the pixel column, and a third load compensation value according to the type of the sensing data to which a load compensation value and a third black grayscale ratio of the third color of the input image data corresponding to the pixel column to each of the first sensing data, the second sensing data, and the third sensing data.

13. A display device comprising:

a display panel including a pixel including a first sub-pixel displaying a first color, a second sub-pixel displaying a second color, and a third sub-pixel displaying a third color;

a data driver applying data voltages generated based on input image data to the pixel in an active period, sensing the first sub-pixel to generate first sensing data in a blank period, sensing the second sub-pixel to generate second sensing data in the blank period, and sensing the third sub-pixel to generate third sensing data in the blank period; and a driving controller compensating for the first sensing data, the second sensing data, and the third sensing data based on a black grayscale ratio of the input image data corresponding to a pixel column including the pixel.

14. The display device of claim 13, wherein the driving controller includes a load lookup table in which a load compensation value according to the black grayscale ratio of the input image data corresponding to the pixel column is stored, and wherein the driving controller compensates for the first sensing data, the second sensing data, and the third sensing data based on the load lookup table.

15. The display device of claim 13, wherein the driving controller adds a load compensation value to each of the first sensing data, the second sensing data, and the third sensing data according to the black grayscale ratio of the input image data corresponding to the pixel column.

16. The display device of claim 15, wherein the load compensation value increases as the black grayscale ratio of the input image data corresponding to the pixel column decreases.

17. The display device of claim 13, wherein the driving controller does not add a load compensation value to the first sensing data, the second sensing data, and the third sensing data when the input image data corresponding to the pixel is a black grayscale value, and wherein the driving controller adds the load compensation value to each of the first sensing data, the second sensing data, and the third sensing data according to the black grayscale ratio of the input image data corresponding to the pixel column when the input image data corresponding to the pixel is not the black grayscale value.

18. The display device of claim 13, wherein the driving controller adds a first load compensation value to the first sensing data according to a first black grayscale ratio of the first color of the input image data corresponding to the pixel column, wherein the driving controller adds a second load compensation value to the second sensing data according to a second black grayscale ratio of the second color of the input image data corresponding to the pixel column, and wherein the driving controller adds a third load compensation value to the third sensing data according to a third black grayscale ratio of the third color of the input image data corresponding to the pixel column.

19. The display device of claim 13, wherein the driving controller adds a first load compensation value according to a type of the sensing data and a first black grayscale ratio of the first color of the input image data corresponding to the pixel column, a second load compensation value according to the type of the sensing data and a second black grayscale ratio of the second color of the input image data corresponding to the pixel column, and a third load compensation value according to the type of the sensing data to which a load compensation value and a third black grayscale ratio of the third color of the input image data corresponding to the pixel column to each of the first sensing data, the second sensing data, and the third sensing data.

* * * * *